(12) United States Patent
Monahan et al.

(10) Patent No.: US 6,254,274 B1
(45) Date of Patent: Jul. 3, 2001

(54) ROLLER BEARING DEVICE

(75) Inventors: Kevin Monahan, Hartland; Thomas Hanson, Oak Creek, both of WI (US)

(73) Assignee: Harken, Inc., Pewaukee, WI (US)

( * ) Notice: Subject to any disclaimer, the term of this patent is extended or adjusted under 35 U.S.C. 154(b) by 0 days.

(21) Appl. No.: 09/431,719

(22) Filed: Oct. 28, 1999

(51) Int. Cl.$^7$ .................................................. F16C 29/06
(52) U.S. Cl. ............................. 384/44; 384/45; 384/48
(58) Field of Search ............................. 384/43, 44, 45, 384/48, 58, 25

(56) References Cited

U.S. PATENT DOCUMENTS

| | | | |
|---|---|---|---|
| 4,375,195 | * | 3/1983 | Tsuboi ............................. 384/58 X |
| 4,396,235 | * | 8/1983 | Teramachi .......................... 384/44 |
| 4,659,238 | * | 4/1987 | Teramachi .......................... 384/44 |
| 4,702,622 | * | 10/1987 | Teramachi .......................... 384/44 |
| 4,918,846 | * | 4/1990 | Tsukada ........................... 384/45 X |
| 4,941,197 | * | 7/1990 | Roeser .............................. 384/44 |
| 5,123,754 | * | 6/1992 | Tanaka .............................. 384/45 |
| 6,109,789 | * | 8/2000 | Chen ................................ 384/48 |

* cited by examiner

*Primary Examiner*—Charles A Marmor
*Assistant Examiner*—Ankur Parekh
(74) *Attorney, Agent, or Firm*—Pyle & Piontek

(57) ABSTRACT

A traveler comprises a track with two lateral side grooves and a top surface, and a car slideably held on the track. The car has first and second lateral side portions, with bearing means in each portion for engaging respective of the track side grooves. The car further has thrust bearings removably held in a race in a car center portion for engaging the track top surface when the car may be tilted towards one or the other lateral sides, as may occur when the car is under a load from that lateral side.

13 Claims, 5 Drawing Sheets

ROLLER BEARING DEVICE

BACKGROUND AND SUMMARY OF THE INVENTION

The present invention relates to a car and track apparatus such as a sailboat traveler or the like generally comprising a roller car slideably mounted on a track.

A particular type of traveler is generally known as a roller traveler, with an example of such described in great detail in U.S. Pat. No. 4,941,197 issued to Roeser. A roller traveler is characterized in that roller bearing means are used as opposed to ball bearings. Roller bearings generally comprise substantially cylindrical members with rotational engagement occurring on their round sidewalls, and no rotational engagement on their substantially flat endwalls.

Under normal operation, cars of travelers such as that disclosed in the '197 patent do not directly contact the track, but ride on sets of lateral side bearings which engage the track along side grooves. The car ideally distributes loads evenly among its lateral bearings. Prior at travelers, including the traveler of the Roeser patent, however, have some significant problems associated with their use.

When loads are located on either side of the track, as opposed to directly along the plane normal to the track, the cars may disadvantageously distribute an uneven load. This results as loads located to one side or the other of the track tend to bear on the car in that direction, as opposed to the directly forward and rearward load placement along the length of the track in which the car is designed to run. When the load is located to one lateral side of the car, bearings along that side are exposed to increased friction and load. In severe circumstances, the car may tilt to an extent that the lower car side contacts the top of the track causing friction and scraping. These problems are most acute for traveler cars that utilize roller bearings, as opposed to ball bearings, as the roller bearings are able to work only uni-directionally.

Uneven loading on the bearings results in increased friction and decreased bearing, track, and car service life. For roller bearing cars such as that disclosed in the Roeser patent, uneven loading can also lead to the axial end wall of the roller bearing coming into moving contact with non-moving parts.

An unresolved need therefor exists for an improved traveler.

OBJECTS OF THE INVENTION

It is an object of the invention to provide a traveler of the type having a car slideable along a track with improved load distribution under loads directed to one or the other lengthwise side of the track.

SUMMARY OF THE INVENTION

The present invention comprises a traveler of the type generally having a car slideably mounted on a track. The car has two lateral side portions, each having side bearings for engaging lateral side grooves of the track. The car further has a center portion having a bottom wall facing and passing over a track top surface. One example of such a traveler is described in detail in U.S. Pat. No. 4,941,197, herein incorporated by reference.

In addition to having two lateral sets of side bearings for engaging the track side grooves, the car of the present invention further comprises additional thrust bearings in the car center portion bottom wall for engaging the track top surface. These thrust bearings are particularly useful in reducing frictional contact between the track top surface and the car center bottom wall when the car may be tilted to one side, as will occur under a load located to one lengthwise side of the track. The thrust bearings also help to more effectively distribute the load on the two sets of side bearings when the car may be under a laterally non-centered load. Increased traveler efficiency and service life are thereby achieved.

Preferably, the thrust bearings-comprise a plurality of ball bearings rotatable about a substantially oval shaped thrust bearing race in the center portion bottom wall, with elongated race portions along the lateral sides of the bottom wall. The preferred thrust race center portion bottom wall comprises a removable center hub that holds the preferred ball bearings in place, and that may be removed for ball bearing installation, maintenance, and repair. The preferred thrust race has a semicircular cross sectional shape for retaining the ball bearings, with a bottom portion of the bearings exposed beyond the plane of the bottom wall surface for rotational engagement with the track top surface.

When a load is located towards either lateral side of the car, the thrust bearings will help to prevent the car from significantly tilting and thereby will maintain an evenly distributed load on the car lateral side bearings. A compressive load will be placed on the ball bearings along the load bearing lateral side of the oval shaped race, while no corresponding compressive load will be placed on the balls passing along the opposite side of the thrust race. In this manner the thrust bearings rotatably engage the track in the direction of movement along the side of the car, and easily re-circulate around the opposite lateral race portion. This engagement prevents the disadvantageous frictional contact associated with travelers of the prior art, as well as distributing the load on the car and bearings more effectively.

Other embodiments of the thrust bearings of the invention include roller bearings on fixed axles located near the lateral sides of the car bottom wall. These roller bearings on axles may take the form of wheels. They may be partially recessed in a slot in the car bottom wall with only a portion exposed beyond the wall for rotational engagement with the track top surface. Still an additional embodiment of the thrust bearings of the invention comprises a low friction sliding member, such as a layer of polymer. The polymer surface extends beyond the car bottom surface for low friction engagement with the track top surface. The low friction member may comprise two strips of polymer running along the lateral sides of the car bottom wall.

The above brief description sets forth rather broadly the more important features of the present disclosure so that the detailed description that follows may be better understood, and so that the present contributions to the art may be better appreciated. There are, of course, additional features of the disclosure that will be described hereinafter which will further describe the subject matter of the invention. In this respect, before explaining an embodiment of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

DETAILED DESCRIPTION

Figure 1:
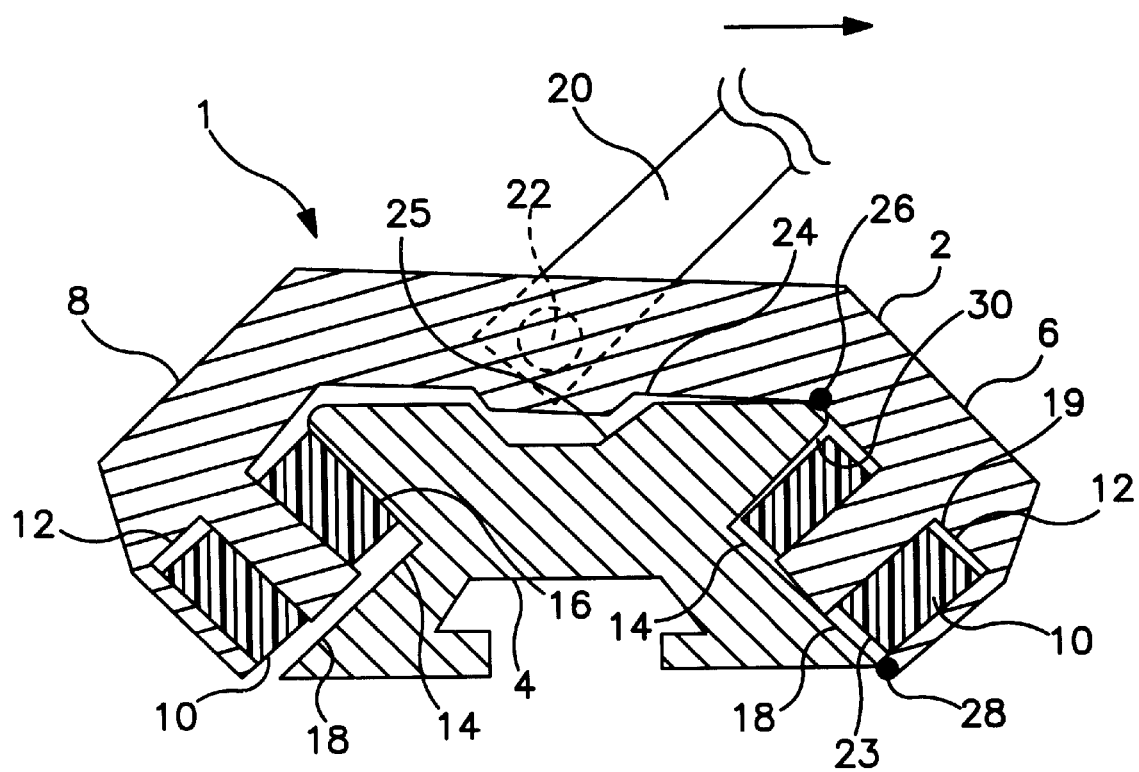
FIG. 1 is a cross sectional view of a traveler, with the car shown in partial cross section of the prior art.

Turning now to the drawings, FIG. 1 is a cross sectional view of a traveler 1 of the prior art, as described in greater detail in U.S. Pat. No. 4,941,197, herein incorporated by reference. Car 2 is slideably mounted on track 4. Car 2 has first and second lateral sides 6 and 8, with a set of roller bearings 10 in lateral race 12 in each lateral side for engaging the side grooves 14 of track 4. As detailed in U.S. Pat. No. 4,941,197, lateral races 12 are recirculating, and may be configured for roller bearings 10 to engage track groove 14 upper side wall 16 or lower side wall 18, as a particular application may call for (FIG. 1 shows bearings 10 engaging upper wall 16). Hanger member 20 may be connected to a load in the direction of arrow L, which can then be carried along the length of track 4. Hangar 20 is pivotally connected to car 2 by rod 22. Traveler 1 may be mounted in a vertical, horizontal, or angled position.

As shown in FIG. 1, as a load may be directed to one lateral side of car 2 in the direction of arrow L, car 2 will tend to tilt in the direction of the load, and will disadvantageously cause the load on car 2 to be unequally distributed between the respective lateral sets of bearings 10. Under the load located towards car side 6 as illustrated in FIG. 1, an increased load on bearings 10 of lateral side 6 result. Although not illustrated in FIG. 1, tilting of car 2 can lead to contact between bearing axial end wall 23 and track lower side wall 18 or car race side wall 19. These results lead to severely decreased efficiency of traveler 1, and to shortened service life for bearings 10 and track 4.

In severe circumstances, a laterally off centered load may cause car 2 to tilt to an extent such that car center portion bottom wall 24 comes into contact with track top surface 25 as shown at point 26, and car race side walls may come into contact with groove 14 at 28. This disadvantageously causes friction, making it more difficult to pull car 2 along track 4. Also, increased wear on both track 4 and car 2 result. Also, as car 2 tilts, roller bearings 10 on the car "low side" may lose engaging contact with groove side wall 16, thereby disadvantageously concentrating the load on the roller bearings 10 on the car "high side". This is evident in FIG. 1 by gap 30.

Figure 2:
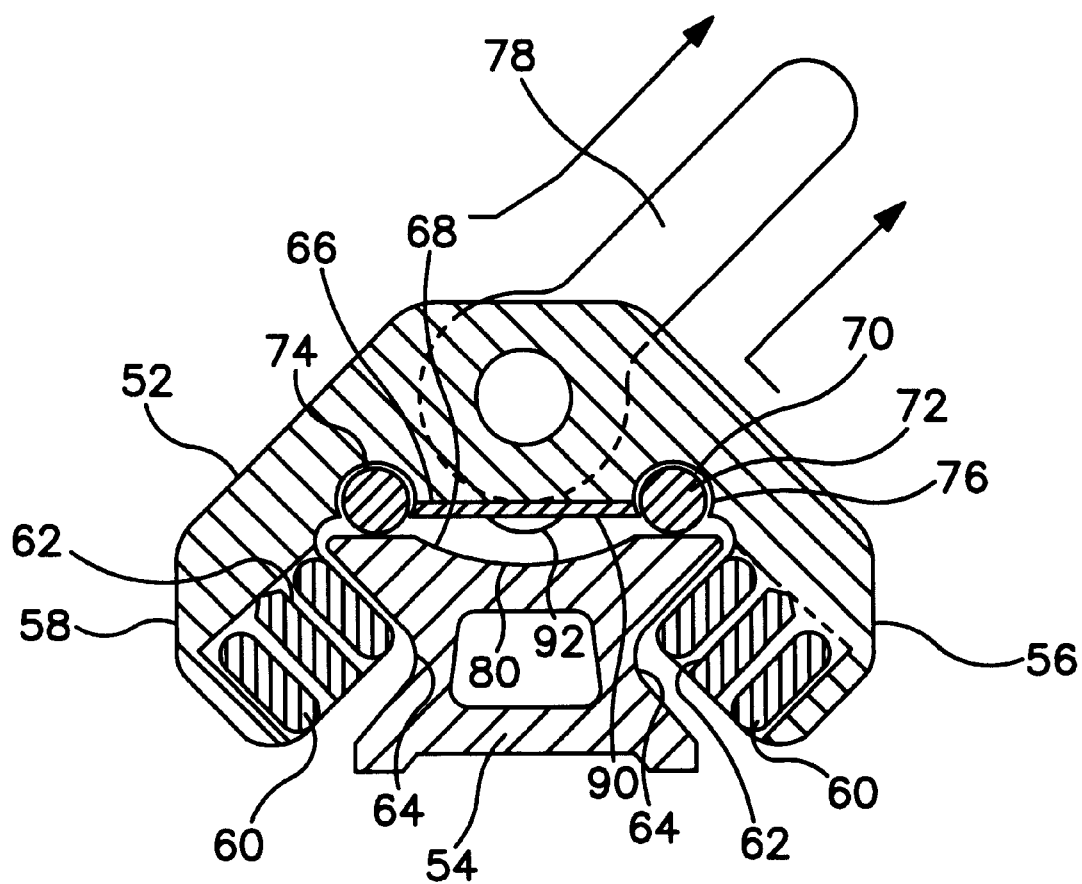
FIG. 2 is a cross sectional view, with the car in partial cross section, of a preferred traveler of the present invention.

The preferred traveler of the present invention effectively solves these and other problems by comprising an additional car race with bearings. FIG. 2 shows a cross sectional view of a preferred car 52 and track 54 of the present invention, with car 52 illustrated in partial cross section. As generally described above and illustrated in FIG. 1 for a traveler of the prior art, car 52 has first and second lateral sides 56 and 58, with a respective set of lateral roller side bearings 60 in a lateral race 62 in each lateral side 56 and 58. Roller side bearings 60 operate in the same manner as described above with reference to the car of the prior art. Car 52 also has center portion bottom wall 66 which faces and passes above track top 68.

In addition to these elements, which as described above with reference to FIG. 1 are generally present in cars of the prior art, car 52 of the invention further comprises thrust bearing means in its center portion for engaging the track top. The preferred thrust bearing means comprise center portion continuous thrust race 70 with a plurality of ball bearings 72 rotatably held therein. Preferred thrust race 70 is generally oval shaped as is best illustrated in the bottom view of car 52 illustrated in FIG. 3, and has first and second elongated side portions 74 and 76 running along the respective first and second lateral sides of car 2. Race 70 has a substantially semicircular cross sectional shape so as to retain bearings 72 therein, with a portion of bearings 72 exposed beyond the plane of bottom wall 66 for rotational engagement with track top surface 68. In addition to the thrust bearing means of the invention comprising the preferred ball bearings rotating about oval race 70, the thrust bearing means may also comprise ball bearings along one or more non-circulating races. For example, two rows of ball bearings rotatably retained in bearing cages may be attached to the car along the bottom wall sides. Other bearing means may also be comprised, as will be discussed in detail below.

Arm 78 is for operative attachment of a load to car 52. For instance, a bearing block controlling the main sheet of a sailboat may be connected to arm 78. As a load is placed on car 52 through hanger member 78 in a direction towards the second lateral side of car 2 in the direction of the arrows, a compressive load will be placed on bearings 72 in race second side 76, while only a minimal or no load will exist on bearings 72 in race first side 74. Thus bearings 72 easily rotate through race side 74 in a return direction, as the car is pulled along the track. When no load is on car 52, or when a load is centered, car 52 will not place a compressive load on one or the other lateral side of car 52 or bearings 72, which will thus offer little resistance to movement of car 52. Alternatively, bearings 72 may be configured such that they are not in contact with track top 68 unless car 52 is in a tilted position.

Figure 3:
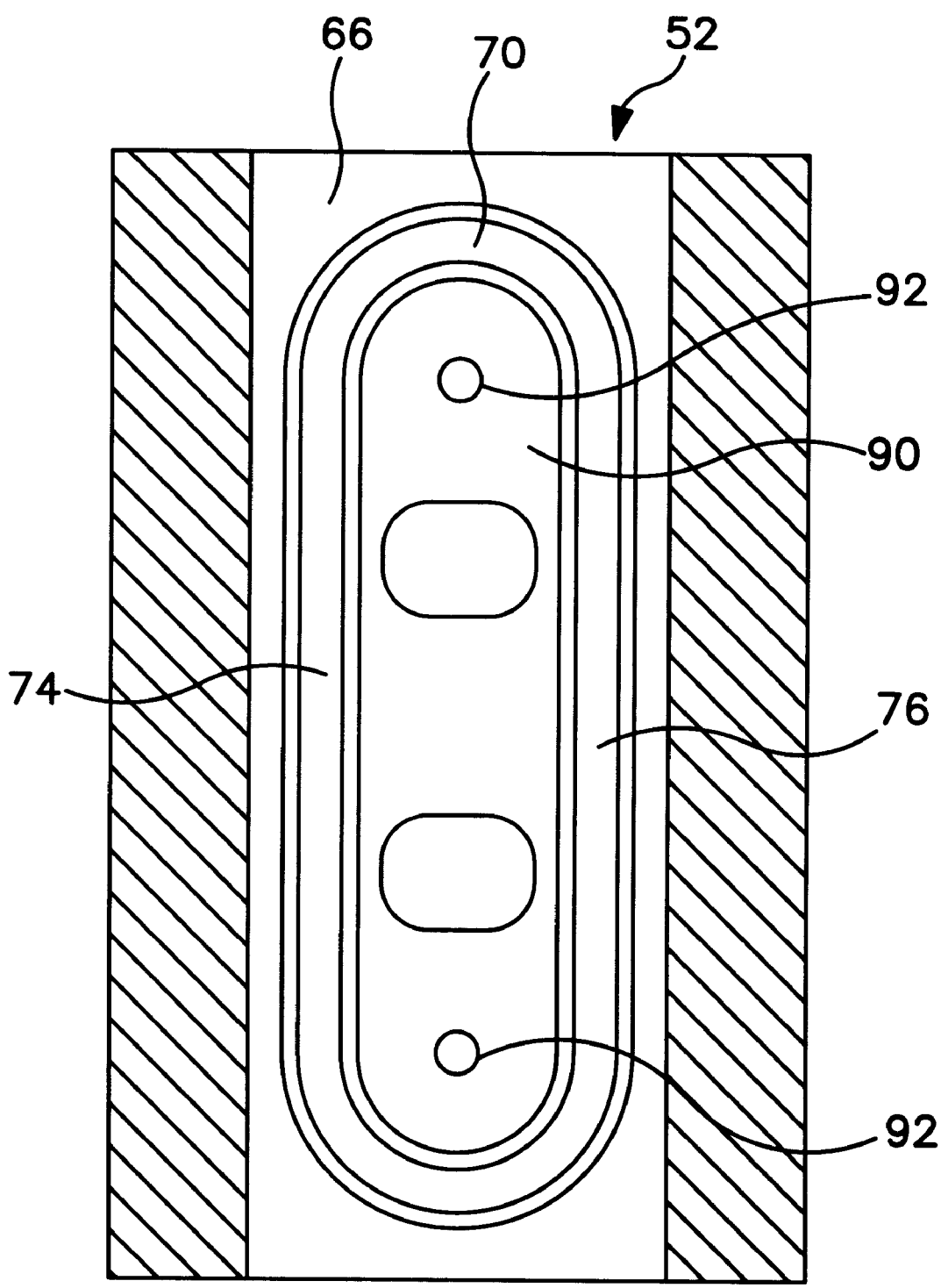
FIG. 3 is a bottom view of the preferred car of the invention, shown in partial cross section.

FIG. 3 shows preferred thrust race 70 further comprising removable hub 90 attached to car center portion bottom wall 66 by screws 92. Hub 90 holds bearings 72 in place in race 70, and may be removed to install, remove, or maintain bearings 72. Referring again to FIG. 2, preferred track 54 has elongated slot 80 for movably receiving screw 92 head.

In another embodiment of the car of the invention, no removable hub is present and thrust race 70 is machined directly in car center portion bottom wall 66 in a substantially semi-circular cross section such that ball bearings 72 are retained therein. A portion of bearings 27 is exposed beyond the plane of bottom wall 66 for rotational engagement with track top 68. In this embodiment, plastic ball bearings 74 may be snap fit into race 70.

As generally explained herein, travelers utilizing roller bearings are most susceptible to shifting under off center loads. The thrust bearings of the present invention may prove particularly advantageous with such travelers. These types of travelers are often called for in association with high loads, as they offer significantly more bearing surface per unit car length than a roller bearing car. An example of a preferred use for the traveler of the invention is as a mainsheet traveler on a large sailboat (>50 ft).

Figure 5:
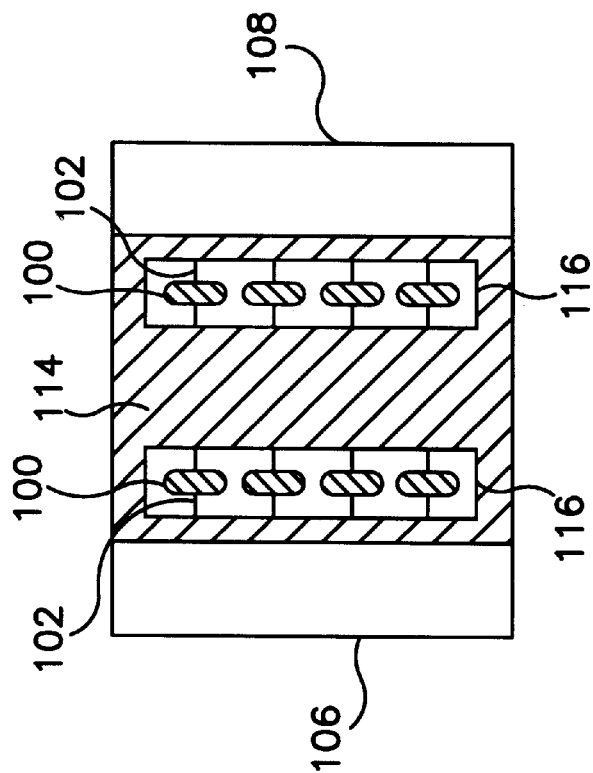
FIG. 5 is a bottom view of the car of FIG. 4, shown in partial cross section.
Figure 4:
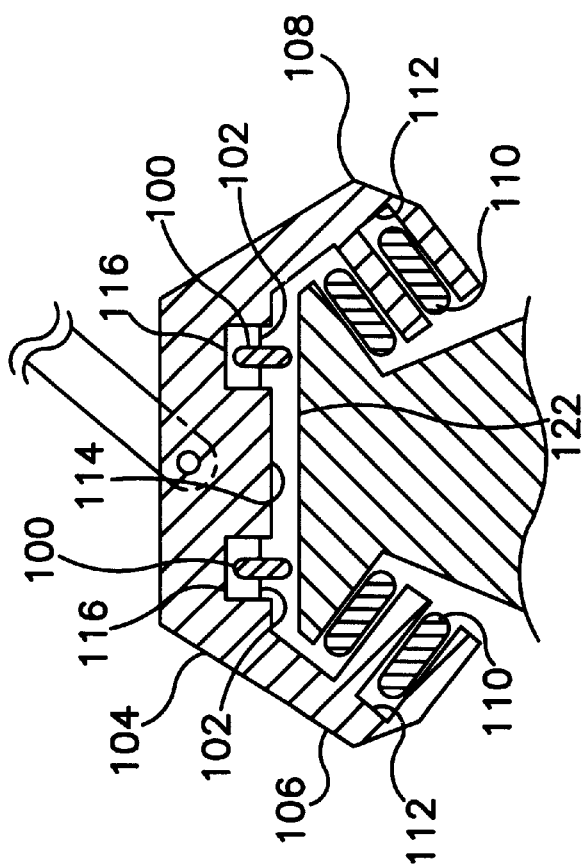
FIG. 4 is a cross sectional view, with the car in partial cross section, of an additional traveler of the present invention.

In addition to the preferred recirculating ball thrust bearings discussed above, the present invention further comprises additional thrust bearing means. A second thrust bearing embodiment of the invention is shown in FIGS. 4 and 5. FIG. 4 is a cross section end view of a traveler of the invention, while FIG. 5 is bottom plan view shown in partial cross section. Roller bearings 100 are rotatably held on fixed axles 102. Car 104 is as generally described above, with lateral side portions 106 and 108, and respective lateral side roller bearings 110 that re-circulate about lateral races 112. A car center portion bottom wall 114 has a pair of slots 116 with a plurality of roller thrust bearings 100 on axles 102 partially recessed in slots 116.

Roller bearings 100 have at least a portion exposed beyond wall 114 for rotational engagement with track top surface 122. When bottom wall 114 is substantially parallel to track top side 122 thrust bearings 100 are preferably not engaged therewith. Should car 104 tilt towards either lateral side, however, one or the other sets of roller thrust bearings 100 will become rotatably engaged.

FIGS. 4 and 5 illustrate two series of four roller thrust bearings 100 for illustration only; a smaller or larger number of roller bearings could of course be used. Also, thrust roller bearings 100 need not be partially recessed in slots 116; they may also be held completely below bottom wall 114.

Figure 7:
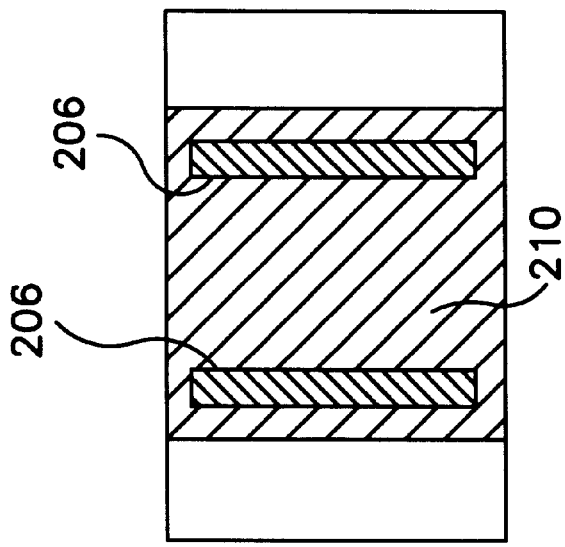
FIG. 7 is a bottom view of the car of FIG. 6, shown in partial cross section.
Figure 6:
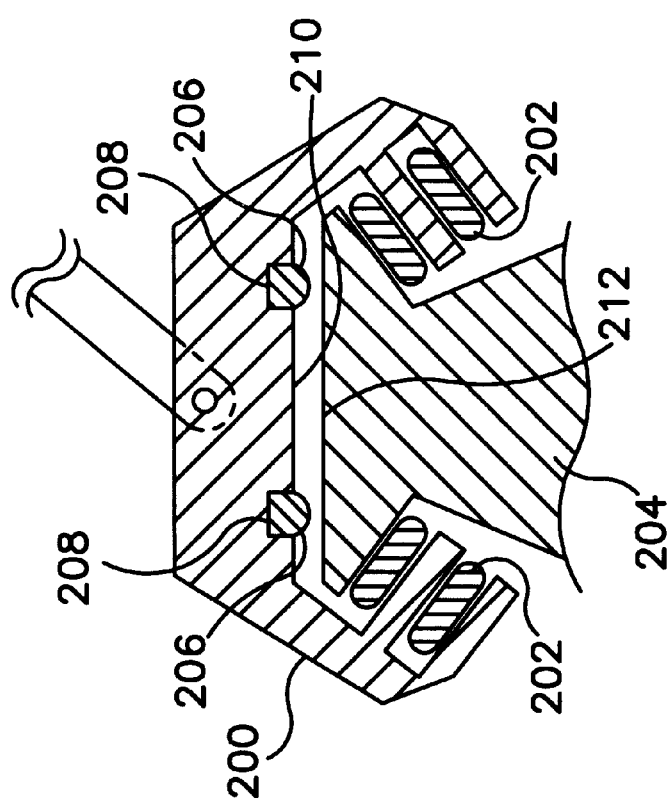
FIG. 6 is a cross sectional view, with the car in partial cross section, of an additional traveler of the present invention.
Figure 8:
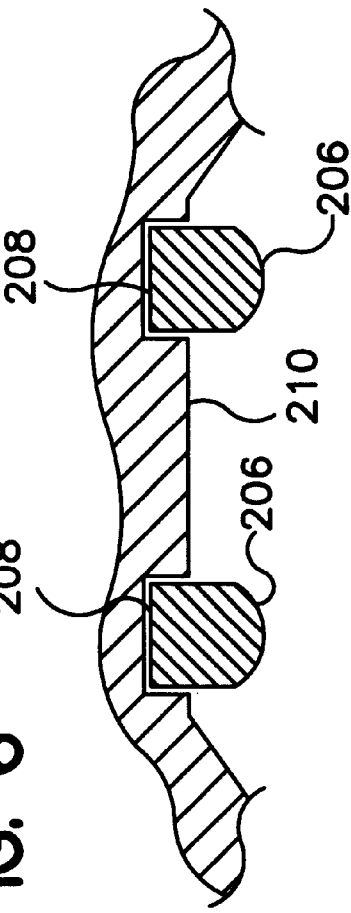
FIG. 8 is a partial cross sectional view of the bottom wall of the car FIG. 7.

FIGS. 6–8 illustrate still an additional embodiment of the traveler of the invention. Car 200, lateral side roller bearings 202, and track 204 are substantially as described above. In this embodiment, the thrust bearings of the invention comprise two strips 206 of low friction polymer material frictionally held in a pair of slots 208 in bottom wall 210 with at least a portion exposed beyond bottom wall 210 for low friction engagement with track top side 212 upon tilting of car 200 towards either lateral side. Strips 206 are preferably comprised of materials that in addition to having a low coefficient of friction on metal also are fairly resilient. It is further noted that as used herein, "low friction" is intended to refer to a condition of having a coefficient of friction on metal that is substantially less than that of metal on metal. As an example, polytetrafluorethylene, nylon, and high density, hard plastics quality as "low friction" materials. In addition to polymer low friction members, the invention may comprise other low friction materials such as ceramics.

The advantages of the disclosed invention are thus attained in an economical, practical, straightforward, and facile manner. While a preferred embodiment has been shown and described, it is to be understood that various further modifications and additional configurations will be apparent to those skilled in the art. In particular, although reference has been made to a traveler as disclosed in U.S. Pat. No. 4,941,197, the present invention is not limited by this reference, and may encompass embodiments not within the scope of that reference. Further, the thrust bearings of the present invention may comprise configurations other than what has been illustrated and described; including, by way of example, two substantially parallel and independent rows of bearings along the lateral sides of the car. It is intended that the specific embodiment herein disclosed be only illustrative of the preferred and best mode for practicing the invention, and should not be interpreted as limitations on the scope of the invention.

What is claimed is:

1. A traveler, comprising:

a) a track with two side grooves, having a top;

b) a car slideable along said track, said car having two lateral side portions, each side portion having lateral bearing means for engaging said track side grooves, said car having a center portion, said center portion having a bottom wall facing and passing over said track top; said bottom wall having first and second lateral sides;

c) a plurality of thrust bearings held in a generally oval race in said car center portion bottom wall, said generally oval race having a circumferential plane substantially parallel with the plane of said car center portion bottom wall; said generally oval shaped race having two elongated sections, a first of said two elongated sections along said car bottom wall first lateral side and a second of said two elongated sections along said car bottom wall second lateral side; said thrust bearings rotatable about said generally oval shaped race as said car moves along said track with said bearings movable in a first direction along one of said two elongated sections and in an opposite return direction along the other of said two elongated sections.

2. A traveler as in claim 1, wherein said generally oval shaped race has a removable center hub for retaining said thrust bearings; said center hub received by said car center portion bottom wall; said thrust bearings removable from said race when said center hub removed.

3. A traveler as in claim 2, wherein said removable center hub is held in place with a screw having a head, and said track top has an elongated slot for movably receiving said head.

4. A traveler as in claim 1, wherein said car lateral bearing means comprise a plurality of roller bearings circulating about races in respective of said car lateral side portions.

5. A traveler as in claim 1, wherein the traveler is for carrying a load, and wherein said car center portion having a top wall, a movable arm connected to said top wall for connection to the load, said movable arm pivotal toward said car first and second lateral sides; said thrust bearings in said generally oval shaped race first elongated section along said car bottom wall first lateral side under load and moving in a first direction to facilitate movement of said car along said track while said thrust bearings return in an opposite direction substantially free of load in said second elongated section along said car bottom wall second lateral side when the load is located towards said car first lateral side and said car is thereby pivoting towards said first lateral side.

6. A traveler as in claim 1, wherein said car pivotal into at least three positions, the first of said three positions comprising a pivoted position towards said car first lateral side; the second of said pivotal positions comprising a substantially level un-pivoted position; and the third of said three positions comprising a pivoted position towards said car second lateral side; and wherein said thrust bearings are in rotatable engagement with said track only along said race first elongated section when said car is in said first position; said thrust bearings not in engagement with said track top when said car is in said second pivotal position; and said thrust bearings are in rotatable engagement with said track only along said second elongated section when said car is in said third position.

7. A traveler comprising:

a) a track with two side grooves, having a top;

b) a car slideable along said track, said car having two lateral side portions, each side portion having lateral bearing means for engaging said track side grooves, said car having a center portion, said center portion having a bottom wall facing and passing over said track top; said center portion bottom wall having two lateral sides;

c) a pair of low friction polymer strips attached to said car center portion bottom wall; one each of said pair of polymer strips proximate one each of said car lateral sides; said polymer strips having a surface extending below said car center portion bottom wall for engagement with said track top surface;

wherein said car having a pair of slots, one each of said slots proximate one each of said first and second lateral sides, and wherein said polymer strips are held within said slots, a portion of the strips extending below said bottom wall surface.

8. A sailboat traveler, comprising:

a) a track with two lateral side grooves, having a top, an elongated slot in said top;

b) a car slideable along said track, said car having first and second lateral sides and first and second lateral side portions, each respective side portion having roller bearings held in roller races for rotatably engaging said track side grooves, said car having a top wall, said car having a center portion with a bottom wall facing said track top;

c) an arm movably attached to said car top wall; said arm adapted for operative connection to a load, said load movable towards either lateral side of said car with said arm pivotally movable towards said lateral sides, said load substantially directed to said car first lateral side when said load is located towards said car first lateral side;

d) thrust bearings comprising a plurality of ball bearings circulating about a substantially oval shaped thrust race in said car center portion bottom wall, a portion of said thrust bearings exposed beyond said center portion bottom wall for rotatably engaging said track top, said thrust race having elongated portions along said car lateral sides, said ball bearings under said load in said first lateral side race portion when said car under said load towards said first lateral side; said race having a removable center hub for inserting and removing said ball bearings, said removable hub held in place with a screw having a head, said head movably received by said track elongated slot.

9. A traveler, comprising:

a) a track with two side grooves, having a top;

b) a car slideable along said track, said car having two lateral side portions, each side portion having lateral bearing means for engaging said track side grooves, said car having a center portion, said center portion having a bottom wall facing and passing over said track top; said bottom wall having first and second lateral sides; said car pivotally movable into at least three positions, the first of said three positions pivoted towards said first lateral side, the second of said three positions pivoted towards said second lateral side, and the third of said three positions a substantially level un-pivoted position; and c) a plurality of thrust bearings held in a generally oval race in said car center portion bottom wall, said generally oval race having a circumferential plane substantially parallel with the plane of said car center portion bottom wall; said generally oval race having two elongated sections, a first of said two elongated sections along said car bottom wall first lateral side and a second of said two elongated sections along said car bottom wall second lateral side; said thrust bearings rotatably engaged with said track top only along said race first elongated section when said car in said first pivotal position, said thrust bearings in rotatable engagement with said track top only along said race second elongated section when said car in said second pivotal position, and said thrust bearings not in engagement with said track top when said car in said third pivotal position.

10. A traveler, comprising:

a) a track with two side grooves, having a top;

b) a car slideable along said track, said car having two lateral side portions, each side portion having lateral bearing means for engaging said track side grooves, said car having a center portion, said center portion having a bottom wall facing and passing over said track top; said center portion bottom wall having a first and a second lateral portion; said center portion having a top wall; said car center portion bottom wall having first and second lateral sides;

c) a movable arm connected to said car center portion top wall; said movable arm pivotal towards said car lateral side portions; said movable arm for connection to a load; said car pivotal towards one of said two lateral side portions when said load is located towards said one of said two lateral side portions; and d) a plurality of thrust bearings housed on said car center portion bottom wall in a continuous generally oval race along and in the place of said car center portion bottom wall; said continuous generally oval race having two elongated sections; one each of said two elongated sections running along each of said car center portion bottom wall two lateral sides wherein said plurality of bearings rotatably engaging said track in the direction opposite of movement of said car along said track along said car center portion first lateral side when said car pivots toward said car first lateral side when a load is located towards said first lateral side while said plurality of bearings moving in an opposite return direction in the direction of movement of said car along said track substantially free from load in said race second elongated section.

11. A traveler as in claim 10, wherein said generally oval race having a removable center hub held in place on said car center portion bottom wall by a screw; said bearings removable from said generally oval race when said center hub removed from said car center portion bottom wall.

12. A traveler as in claim 11, wherein said screw having a head, said head extending below said car central portion bottom wall; said track having an elongated slot for passing said screw head.

13. A traveler, comprising:

a) a track with two side grooves, having a top; having an elongated slot in said top;

b) a car slideable along said track, said car having two lateral side portions, each side portion having lateral bearing means for engaging said track side grooves, said car having a center portion, said center portion having a bottom wall facing and passing over said track top; said center portion bottom wall having a first and a second lateral side; said center portion having a top wall;

c) a movable arm connected to said car center portion top wall; said movable arm pivotal towards said car lateral side portions; said movable arm for connection to a load; said car pivotal towards one of said two lateral side portions when said load is located towards respective of said one of said two lateral side portions;

d) a plurality of thrust bearings housed on said car center portion bottom wall in a continuous generally oval race along and in the plane of said car center portion bottom wall; said race having two elongated sections; one each of said two elongated sections running along each of said car center portion bottom wall two lateral sides wherein said plurality of bearings rotatably engaging said track in a first direction to facilitate movement of said car along said track along said car center portion first lateral side when said car pivots toward said car first lateral side when a load is located towards said first lateral side while said plurality of bearings simultaneously moving in an opposite return direction substantially free from load in said race second elongated section; and e) a removable center hub defining the center of said generally oval race, said removable center hub held in place on said car center portion bottom wall by a screw; said screw having a head extending below said car center portion bottom wall, said screw head received by said track elongated slot; said bearings removable from said generally oval race when said center hub removed from said car center portion bottom wall.

\* \* \* \* \*